United States Patent
Kajino

(10) Patent No.: US 9,712,087 B2
(45) Date of Patent: Jul. 18, 2017

(54) PIEZOELECTRIC ELEMENT DRIVE CIRCUIT AND ROBOT

(71) Applicant: Seiko Epson Corporation, Tokyo (JP)

(72) Inventor: Kiichi Kajino, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/011,894

(22) Filed: Feb. 1, 2016

(65) Prior Publication Data

US 2016/0226403 A1    Aug. 4, 2016

(30) Foreign Application Priority Data

Feb. 2, 2015  (JP) .................................. 2015-018206

(51) Int. Cl.
| | |
|---|---|
| *H02N 2/00* | (2006.01) |
| *B25J 9/12* | (2006.01) |
| *H02N 2/10* | (2006.01) |

(52) U.S. Cl.
CPC .............. *H02N 2/0075* (2013.01); *B25J 9/12* (2013.01); *H02N 2/004* (2013.01); *H02N 2/103* (2013.01); *Y10S 901/23* (2013.01)

(58) Field of Classification Search
CPC ...... H02N 2/004; H02N 2/0075; H02N 2/103; H02N 2/06; H02N 2/14
USPC ........................ 310/314, 317, 323.01–323.21
See application file for complete search history.

(56) References Cited

U.S. PATENT DOCUMENTS

| | | |
|---|---|---|
| 5,311,093 A | 5/1994 | Mukohjima |
| 2004/0256956 A1 | 12/2004 | Miyazawa |
| 2012/0248805 A1 | 10/2012 | Kamijo et al. |
| 2013/0334932 A1 | 12/2013 | Maruyama et al. |

FOREIGN PATENT DOCUMENTS

| | | |
|---|---|---|
| JP | 01-268464 A | 10/1989 |
| JP | 07-115785 A | 5/1995 |
| JP | 07-231683 A | 8/1995 |
| JP | 2000-263780 A | 9/2000 |
| JP | 2004-320979 A | 11/2004 |
| WO | WO-00-45444 A1 | 8/2000 |

OTHER PUBLICATIONS

Extended European Search Report for Patent Application No. EP16153338.5 dated Jun. 24, 2016 (7 pages).

*Primary Examiner* — Derek Rosenau
(74) *Attorney, Agent, or Firm* — Harness, Dickey & Pierce, P.L.C.

(57) ABSTRACT

A piezoelectric element drive circuit includes a piezoelectric element that has a piezoelectric substance whose thickness is 0.05μ to 20 μm and two electrodes which interpose the piezoelectric substance therebetween, an inductor that is connected to the piezoelectric element in parallel, and a drive voltage generation circuit that applies a drive voltage including an AC component to the piezoelectric element and the inductor.

3 Claims, 12 Drawing Sheets

PIEZOELECTRIC ELEMENT DRIVE CIRCUIT AND ROBOT

BACKGROUND

1. Technical Field

The present invention relates to a piezoelectric element drive circuit and various apparatuses such as a robot including a piezoelectric element drive circuit.

2. Related Art

In the related art, a piezoelectric actuator (piezoelectric drive device) using a piezoelectric element is known (for example, JP-A-2004-320979). According to a basic configuration of the piezoelectric drive device, four piezoelectric elements are configured to be arranged in two rows and two columns on two surfaces of a reinforcing plate. Eight piezoelectric elements in total are disposed on both sides of the reinforcing plate. Each of the piezoelectric elements is a unit which interposes each piezoelectric substance between two electrodes. The reinforcing plate is used as one electrode of the piezoelectric element. One end of the reinforcing plate has a protrusion portion disposed in order to rotate a rotor by coming into contact with the rotor serving as a driven body. If an AC voltage is applied to the two piezoelectric elements arranged at opposite angles among the four piezoelectric elements, the two piezoelectric elements perform expansion and contraction movement. In response to the movement, the protrusion portion of the reinforcing plate performs reciprocating movement or elliptical movement. Then, in response to the reciprocating movement or the elliptical movement of the protrusion portion of the reinforcing plate, the rotor serving as the driven body is rotated in a predetermined rotation direction. The rotor can be rotated in the opposite direction by switching from the two piezoelectric elements to which the AC voltage is applied to the other two piezoelectric elements.

In the related art, as the piezoelectric substance used for the piezoelectric drive device, a so-called bulky piezoelectric substance is used. The "bulky piezoelectric substance" described herein means a piezoelectric substance whose thickness is 100 µm or greater. The reason of using the bulky piezoelectric substance is to increase the thickness of the piezoelectric substance in order to sufficiently strengthen force applied from the piezoelectric drive device.

In addition, in the piezoelectric drive device which employs the piezoelectric element, a technology is known in which an inductive element is connected to the piezoelectric element in parallel in order to decrease power consumption (refer to JP-A-7-231683).

Incidentally, there is a need to miniaturize a piezoelectric drive device and to use the miniaturized piezoelectric drive device as a small actuator which can be accommodated in a small space. However, in a case of the actuator which employs the piezoelectric element formed of a thin film in which a thickness of the piezoelectric substance is smaller than 100 µm, a large amount of currents flows due to a large electrostatic capacity of the piezoelectric element, thereby causing a problem in that current consumption cannot be sufficiently decreased in the related art.

SUMMARY

An advantage of some aspects of the invention is to solve at least a part of the problems described above, and the invention can be implemented as the following forms or application examples.

(1) An aspect of the invention provides a piezoelectric element drive circuit which drives a piezoelectric element. The piezoelectric element drive circuit includes: a piezoelectric element that has a piezoelectric substance whose thickness is 0.05µ to 20 µm, and two electrodes which interpose the piezoelectric substance therebetween; an inductor that is connected to the piezoelectric element in parallel; and a drive voltage generation circuit that applies a drive voltage including an AC component to the piezoelectric element and the inductor.

According to this piezoelectric element drive circuit, the inductor can decrease a current flowing into the piezoelectric element having a thin film piezoelectric substance. Therefore, it is possible to decrease power consumption of the piezoelectric element drive circuit.

(2) The piezoelectric element drive circuit may further include a capacitor that is connected to the inductor in series. The drive voltage may be a voltage obtained by adding a DC component to the AC component.

With this configuration, the capacitor can block the DC component flowing into the inductor. Therefore, it is possible to further decrease power consumption of the piezoelectric element drive circuit.

(3) In the piezoelectric element drive circuit, inductance of the inductor may be a sum of first inductance which configures parallel resonance with the piezoelectric element and second inductance which configures series resonance with the capacitor, and may be set so that a resonance frequency of the parallel resonance and a resonance frequency of the series resonance are coincident with each other.

With this configuration, while the DC component can be blocked, the resonance can be achieved. Therefore, it is possible to further decrease power consumption of the piezoelectric element drive circuit.

(4) In the piezoelectric element drive circuit, the inductor may be connected to the multiple piezoelectric elements in parallel. The drive voltage generation circuit may supply the drive voltage in common to the multiple piezoelectric elements which are connected in parallel.

With this configuration, the electrostatic capacity of the multiple piezoelectric elements connected in parallel increases. However, the inductor connected to the multiple piezoelectric elements in parallel can decrease power consumption of the piezoelectric element drive circuit.

The invention can be implemented in various aspects. For example, in addition to the piezoelectric element drive circuit, the invention can be implemented in various aspects of various apparatuses and a drive method thereof, such as a piezoelectric drive device, a drive method of the piezoelectric drive device, a robot having the piezoelectric element drive circuit or the piezoelectric drive device mounted thereon.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
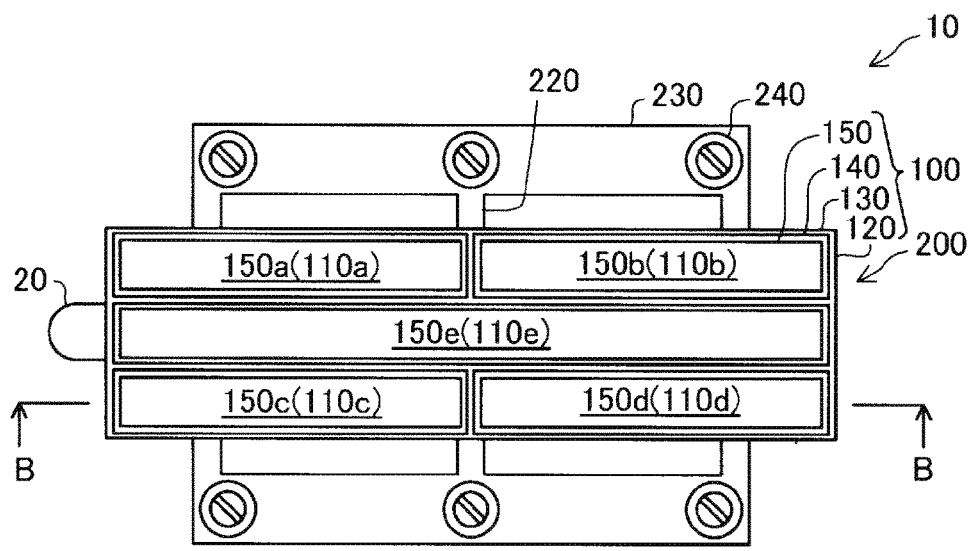
FIGS. 1A and 1B are respectively a plan view and a sectional view which illustrate a schematic configuration of a piezoelectric drive device according to a first embodiment.
Figure 1B:
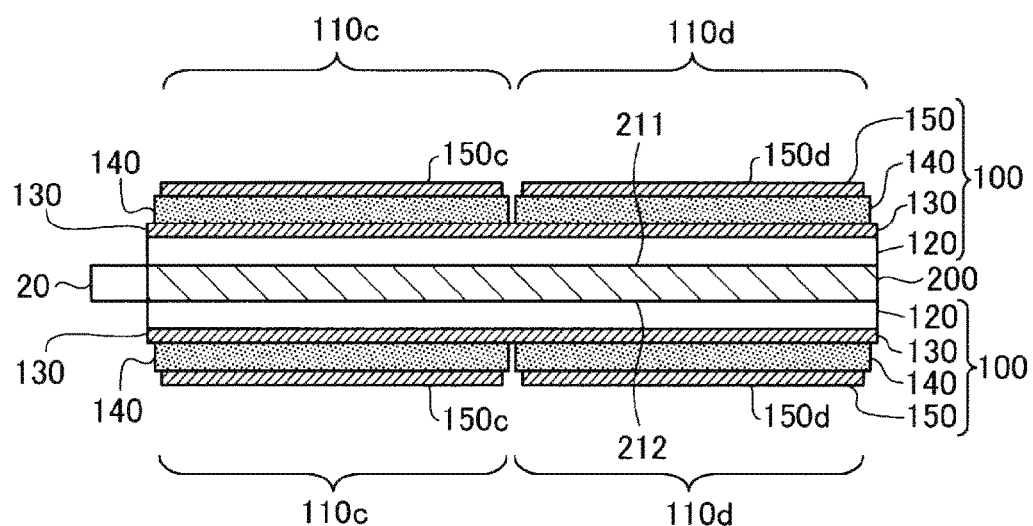

Overall Configuration of Piezoelectric Drive Device:

FIG. 1A is a plan view illustrating a schematic configuration of a piezoelectric drive device 10 according to a first embodiment of the invention. FIG. 1B is a sectional view taken along line B-B in FIG. 1A. The piezoelectric drive device 10 includes a vibrating plate 200 and two piezoelectric vibrating bodies 100 which are respectively arranged on both surfaces (first surface 211 and second surface 212) of the vibrating plate 200. The piezoelectric vibrating body 100 includes a substrate 120, a first electrode 130 which is formed on the substrate 120, a piezoelectric substance 140 which is formed on the first electrode 130, and a second electrode 150 which is formed on the piezoelectric substance 140. The first electrode 130 and the second electrode 150 interpose the piezoelectric substance 140 therebetween. The two piezoelectric vibrating bodies 100 are arranged symmetrical to each other around the vibrating plate 200. The two piezoelectric vibrating bodies 100 have the same configuration as each other. Thus, unless otherwise specified in the following, a configuration of the piezoelectric vibrating body 100 located on an upper side of the vibrating plate 200 will be described.

The substrate 120 of the piezoelectric vibrating body 100 is used as a substrate for forming the first electrode 130, the piezoelectric substance 140, and the second electrode 150 through a film forming process. The substrate 120 also has a function as a vibrating plate for mechanical vibrating. For example, the substrate 120 can be formed of Si, $Al_2O_3$, and $ZrO_2$. For example, as the substrate 120 made of Si, it is possible to use a Si wafer for semiconductor manufacturing. According to this embodiment, a planar shape of the substrate 120 is rectangular. For example, preferably, the thickness of the substrate 120 is set to a range of 10 μm to 100 μm. If the thickness of the substrate 120 is set to 10 μm or greater, the substrate 120 can be relatively easily handled when the film forming process on the substrate 120 is performed. If the thickness of the substrate 120 is set to 100 μm or smaller, the substrate 120 can be easily vibrated in response to expansion or contraction of the piezoelectric substance 140 formed of a thin film.

The first electrode 130 is formed as one continuous conductive layer which is formed on the substrate 120. In contrast, as illustrated in FIG. 1A, the second electrode 150 is divided into five conductive layers 150a to 150e (also referred to as "second electrodes 150a to 150e"). The second electrode 150e located in the center is formed in a rectangular shape extending over the substantially whole body in the longitudinal direction of the substrate 120, in the center in the width direction of the substrate 120. The other four second electrodes 150a, 150b, 150c, and 150d have the same planar shape, and are formed at positions of four corners of the substrate 120. In an example illustrated in FIGS. 1A and 1B, both the first electrode 130 and the second electrode 150 have a rectangular planar shape. For example, the first electrode 130 or the second electrode 150 is a thin film formed by means of sputtering. For example, as a material of the first electrode 130 or the second electrode 150, it is possible to use any highly conductive material such as Aluminum (Al), nickel (Ni), gold (Au), platinum (Pt), and iridium (Ir). Instead of configuring the first electrode 130 to include one continuous conductive layer, the first electrode 130 may be divided into five conductive layers having substantially the same planar shape as that of the second electrodes 150a to 150e. Wiring (or a wiring layer and an insulating layer) for electrical connection between the second electrodes 150a to 150e, and wiring (or a wiring layer and an insulating layer) for electrical connection between the first electrode 130 and the second electrodes 150a to 150e are omitted in the illustration in FIGS. 1A and 1B.

The piezoelectric substance 140 is formed as five piezoelectric layers having substantially the same planar shape as that of the second electrodes 150a to 150e. Alternatively, the piezoelectric substance 140 may be formed as one continuous piezoelectric layer having substantially the same planar shape as that of the first electrode 130. Five piezoelectric elements 110a to 110e (refer to FIG. 1A) are configured to include a layered structure of the first electrode 130, the piezoelectric substance 140, and the second electrodes 150a to 150e.

For example, the piezoelectric substance 140 is a thin film formed using a sol-gel method or a sputtering method. As a material of the piezoelectric substance 140, it is possible to use any material which shows a piezoelectric effect, such as ceramics employing a Perovskite structure of $ABO_3$ type. For example, as the ceramics employing the Perovskite structure of $ABO_3$ type, it is possible to use lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, lead zinc niobate, scandium lead niobate, and the like. For example, in addition to the ceramic, it is also possible to use a material which shows a piezoelectric effect, such as polyvinylidene fluoride, a crystal, and the like. For example, preferably, the thickness of the piezoelectric substance 140 is set to a range of 50 nm (0.05 μm) to 20 μm. A thin film of the piezoelectric substance 140 having the thickness in this range can be easily formed using a thin film forming process. If the thickness of the piezoelectric substance 140 is set to 0.05 μm or greater, a sufficiently strong force can be generated in response to expansion or contraction of the piezoelectric substance 140. If the thickness of the piezoelectric substance 140 is set to 20 μm or smaller, the piezoelectric drive device 10 can be sufficiently miniaturized.

Figure 2:
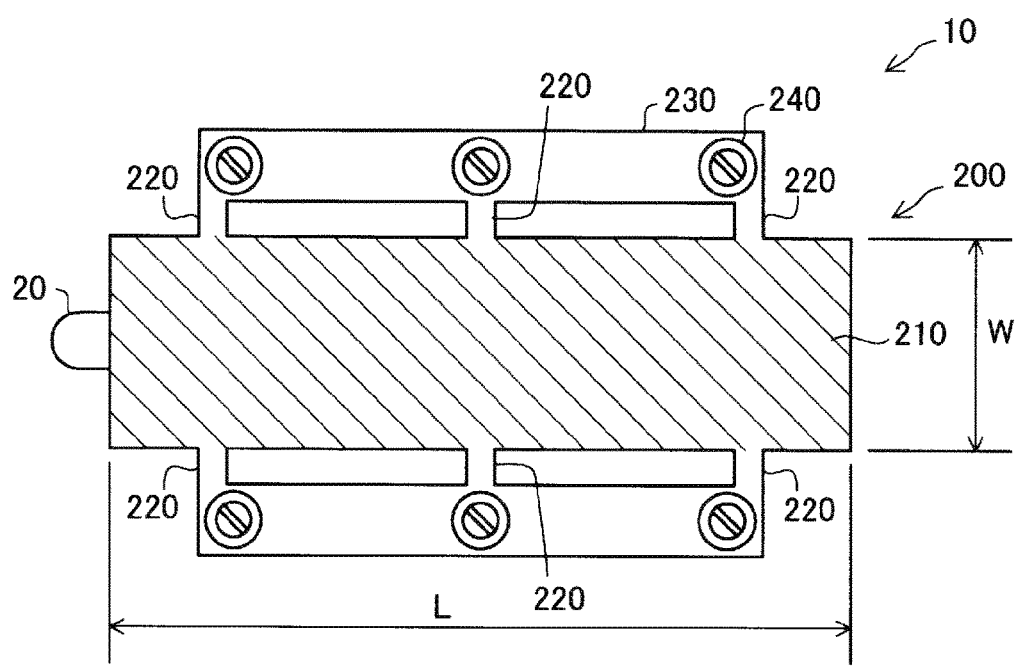
FIG. 2 is a plan view of a vibrating plate.

FIG. 2 is a plan view of the vibrating plate 200. The vibrating plate 200 has a rectangular vibrating body portion 210, and connection portions 220 which respectively triply extend from the right and left long sides of the vibrating body portion 210. In addition, the vibrating plate 200 has two attachment portions 230 which are respectively connected to the three connection portions 220 on the right and left sides. In FIG. 2, for convenience of illustration, the vibrating body portion 210 is hatched. The attachment portion 230 is used in order to attach the piezoelectric drive device 10 to other members by using a screw 240. For example, the vibrating plate 200 can be formed of metal such as silicon, silicon compound, stainless steel, aluminum, aluminum alloy, titanium, titanium alloy, copper, copper alloy, iron-nickel alloy, and the like, metal oxide, or materials such as diamond and the like.

The piezoelectric vibrating bodies 100 (refer to FIGS. 1A and 1B) respectively adhere to an upper surface (first surface) and a lower surface (second surface) of the vibrating body portion 210 by using an adhesive. Preferably, a ratio between a length L and a width W of the vibrating body portion 210 is set to L:W=approximately 7:2. The ratio is a preferred value used in order to perform ultrasonic vibrations (to be described later) by which the vibrating body portion 210 is bent to the right and left along its plane. For example, the length L of the vibrating body portion 210 can be set to a range of 0.1 mm to 30 mm. For example, the width W can be set to a range of 0.05 mm to 8 mm. Preferably, the length L is set to 50 mm or smaller in order for the vibrating body portion 210 to perform the ultrasonic vibrations. For example, the thickness (thickness of the vibrating plate 200) of the vibrating body portion 210 can be set to a range of 20 μm to 700 μm. If the thickness of the vibrating body portion 210 is set to 20 μm or greater, the vibrating body portion 210 has sufficient rigidity in order to support the piezoelectric vibrating body 100. If the thickness of the vibrating body portion 210 is set to 700 μm or smaller, the vibrating body portion 210 is enabled to have sufficiently large deformation in response to deformation of the piezoelectric vibrating body 100.

A protrusion portion 20 (also referred to as a "contact portion" or an "operation portion") is disposed on one short side of the vibrating plate 200. The protrusion portion 20 comes into contact with a driven body so as to apply force to the driven body. Preferably, the protrusion portion 20 is formed of a durable material such as ceramics (for example, $Al_2O_3$).

Figure 3:
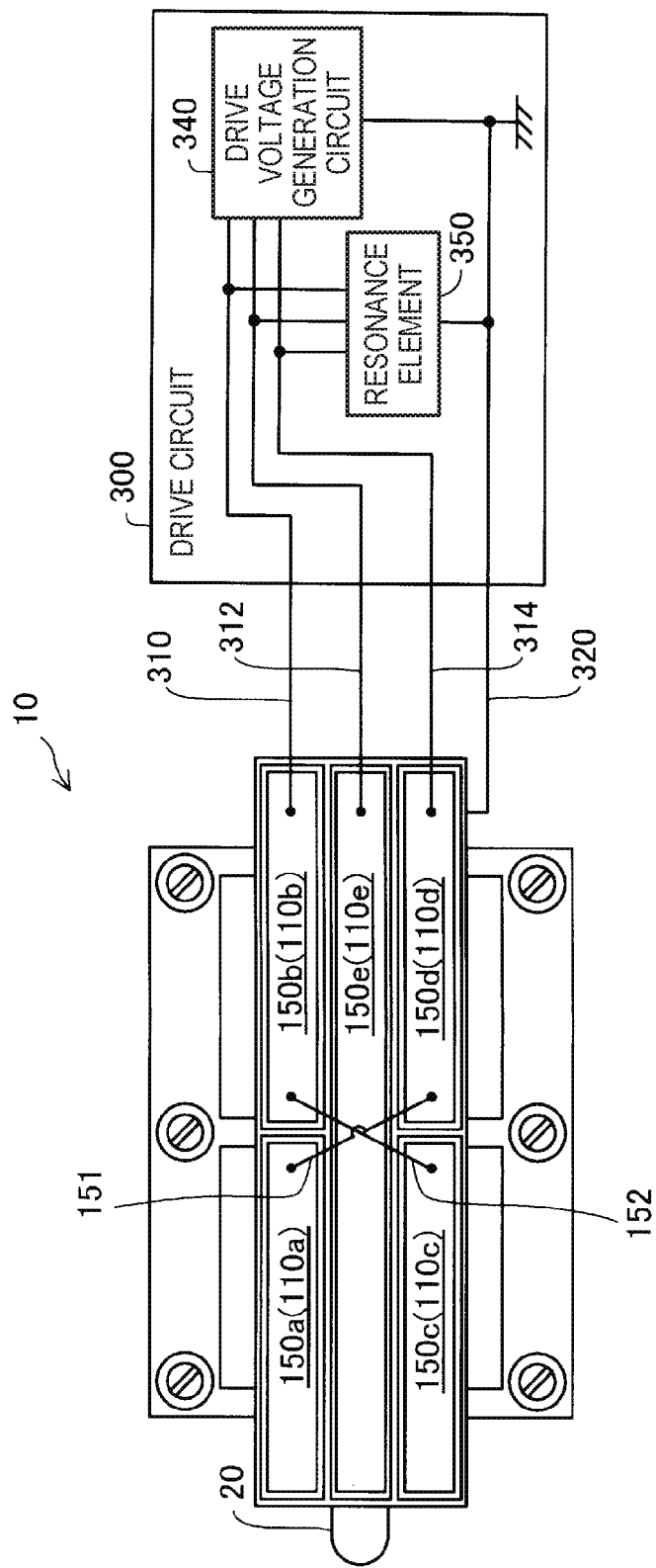
FIG. 3 is a view for describing an electrical connection state between the piezoelectric drive device and a drive circuit.

FIG. 3 is a view for describing an electrical connection state between the piezoelectric drive device 10 and a drive circuit 300. The drive circuit 300 includes a drive voltage generation circuit 340 and a resonance element 350. The drive voltage generation circuit 340 generates a drive voltage including an AC component. Preferably, as the drive voltage, the drive voltage generation circuit 340 is configured to be capable of generating at least any one of an AC drive voltage including only the AC component varying between a positive side and a negative side with respect to ground potential and an offset-provided drive voltage including the AC component and a DC offset (DC component). Preferably, the AC component of the drive voltage is a voltage signal having a frequency close to a mechanical resonance frequency of the piezoelectric drive device 10. A waveform of the AC component is typically a sine wave, but may have a waveform other than the sine wave. The DC component is not necessarily strictly constant, and may vary to a certain degree. For example, the DC component may vary within ±10% of the average value.

Figure 4A:
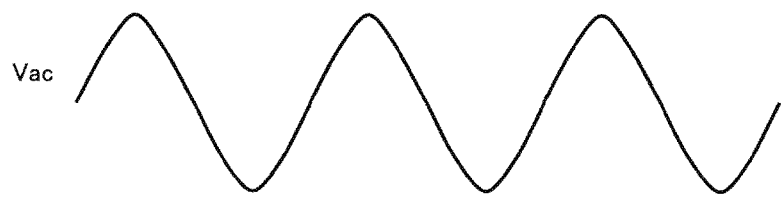
FIGS. 4A to 4C are views for describing a waveform example of an AC component of a drive voltage.
Figure 4B:
Figure 4C:
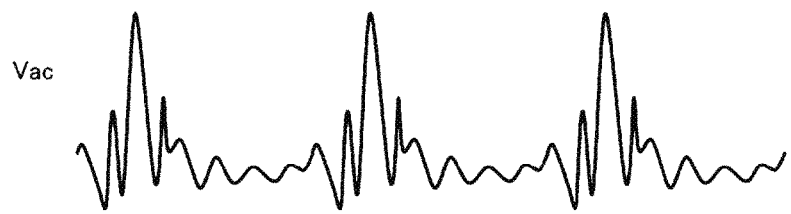

FIGS. 4A to 4C illustrate a waveform example of an AC component Vac of the drive voltage. The AC component Vac in FIG. 4A is the sine wave. The AC component Vac in FIGS. 4B and 4C is not the sine wave, but has a cyclical waveform. As can be understood from these examples, as long as the AC component Vac of the drive voltage is cyclical, various types of waveforms can be employed.

The drive circuit 300 and the electrodes 130 and 150 of the piezoelectric drive device 10 which are illustrated in FIG. 3 are connected as follows. Among the five second electrodes 150a to 150e of the piezoelectric drive device 10, a pair of the second electrodes 150a and 150d which are located at opposite angles are electrically connected to each other via a wire 151. A pair of the second electrodes 150b and 150c which are located other opposite angles are also electrically connected to each other via a wire 152. The wires 151 and 152 may be formed using a film forming process, or may be implemented by means of wire-shaped wiring. The three second electrodes 150b, 150e, and 150d located on the right side in FIG. 3 and the first electrode 130 (refer to FIGS. 1A and 1B) are electrically connected to the drive voltage generation circuit 340 via wires 310, 312, 314, and 320. In the example illustrated in FIG. 3, the wire 320 is grounded. The resonance element 350 is connected to the drive voltage generation circuit 340 in parallel between the grounding wire 320 and the other wires 310, 312, and 314.

The drive voltage generation circuit 340 applies the drive voltage including the AC component between a pair of the second electrodes 150a and 150d and the first electrode 130, thereby causing the piezoelectric drive device 10 to perform ultrasonic vibrations. In this manner, a rotor (driven body) which comes into contact with the protrusion portion 20 can be rotated in a predetermined rotation direction. The drive voltage generation circuit 340 applies the drive voltage including the AC component between a pair of the other second electrodes 150b and 150c and the first electrode 130, thereby enabling the rotor which comes into contact with the protrusion portion 20 to be rotated in the opposite direction. The voltage is simultaneously applied to the two piezoelectric vibrating bodies 100 respectively disposed on both surfaces of the vibrating plate 200. Wiring (or a wiring layer and an insulating layer) configuring the wires 151, 152, 310, 312, 314, and 320 illustrated in FIG. 3 are omitted in the illustration in FIGS. 1A and 1B.

Figure 5:
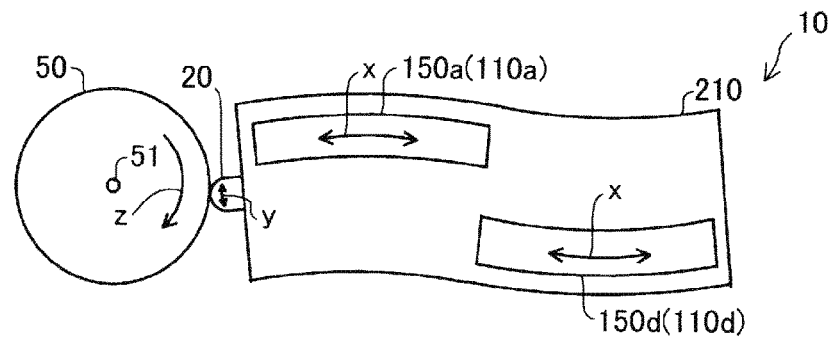
FIG. 5 is a view for describing an operation example of the piezoelectric drive device.

FIG. 5 is a view for describing an operation example of the piezoelectric drive device 10. The protrusion portion 20 of the piezoelectric drive device 10 is in contact with an outer periphery of a rotor 50. In the example illustrated in FIG. 5, the drive circuit 300 (refer to FIG. 3) applies the drive voltage including the AC component between a pair of the second electrodes 150a and 150d and the first electrode 130. The piezoelectric elements 110a and 110d expand and contract in a direction of an arrow x in FIG. 5. In response to this, the vibrating body portion 210 of the piezoelectric drive device 10 is deformed into a meandering shape (S-shape) which is bent inside a plane of the vibrating body portion 210. A distal end of the protrusion portion 20 performs reciprocating movement or elliptical movement in a direction of an arrow y. As a result, the rotor 50 is rotated around a center 51 thereof in a predetermined direction z (clockwise direction in FIG. 5). The three connection portions 220 (refer to FIG. 2) of the vibrating plate 200 described with reference to FIG. 2 are disposed at a position of a vibration knot (joint) of the vibrating body portion 210 described above. When the drive voltage generation circuit 340 applies the drive voltage including the AC component to a pair of the other second electrodes 150b and 150c and the first electrode 130, the rotor 50 is rotated in the opposite direction. If the same voltage as that of a pair of the second electrodes 150a and 150d (or a pair of the other second electrodes 150b and 150c) is applied to the second electrode 150e in the center, the piezoelectric drive device 10 expands or contracts in the longitudinal direction. Accordingly, it is possible to increase force applied from the protrusion portion 20 to the rotor 50. This operation of the piezoelectric drive device 10 (or the piezoelectric vibrating body 100) is disclosed in JP-A-2004-320979 or corresponding U.S. Pat. No. 7,224,102, the content of which is incorporated by reference.

Various Embodiments of Piezoelectric Element Drive Circuit

Figure 6A:
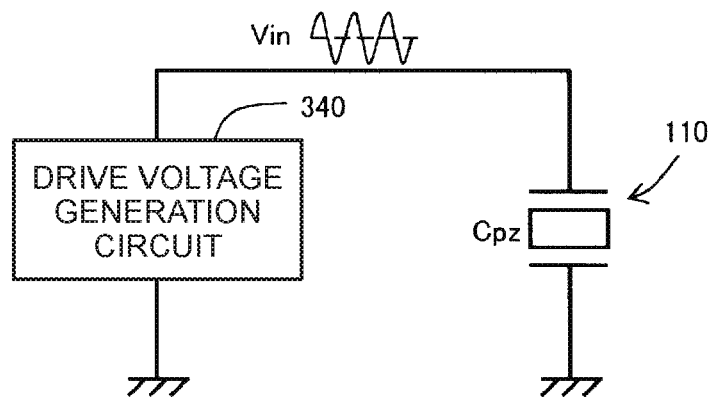
FIGS. 6A and 6B are views for describing a configuration of a piezoelectric element drive circuit according to a comparative example and the first embodiment.
Figure 6B:
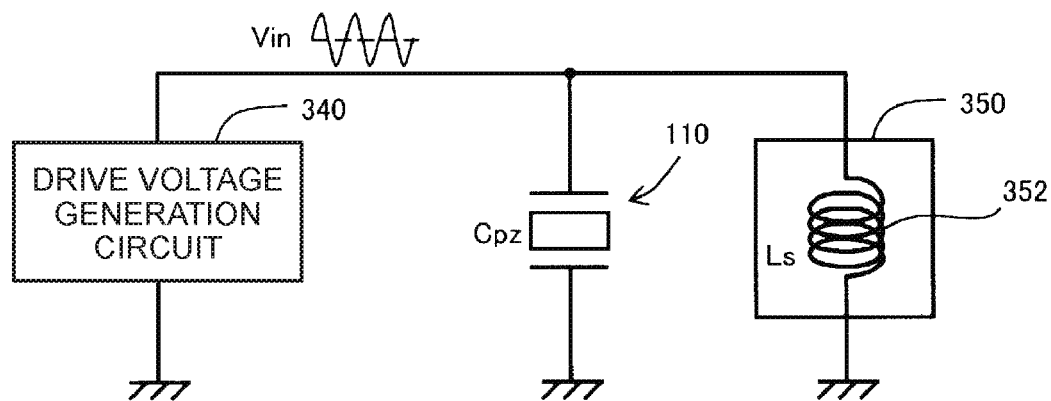

FIGS. 6A and 6B are views for describing a configuration of a piezoelectric element drive circuit according to a comparative example and a first embodiment. The piezoelectric element drive circuit according to the comparative example illustrated in FIG. 6A is configured to include the drive voltage generation circuit 340 and the piezoelectric element 110 connected to the drive voltage generation circuit 340, and does not have the resonance element 350. The piezoelectric element 110 is equivalent to a capacitor having an electrostatic capacity Cpz. The piezoelectric element drive circuit according to the first embodiment illustrated in FIG. 6B is configured to include the drive voltage generation circuit 340, the piezoelectric element 110 connected to the drive voltage generation circuit 340, and the resonance element 350 connected to the piezoelectric element 110 in parallel. The resonance element 350 is configured to include an inductor 352. For example, the inductor 352 is disposed so as to correspond to piezoelectric element 110e in FIG. 3. It is preferable to similarly and respectively dispose the inductor in the other piezoelectric elements 110b and 110d. The drive voltage generation circuit 340 supplies a drive voltage Vin including only the AC component to the piezoelectric element 110.

Preferably, inductance Ls of the inductor 352 in FIGS. 6A and 6B is set so as to satisfy the following expression.

$$f_{vin}=1/\{2\pi\sqrt{(Ls \cdot Cpz)}\} \quad (1)$$

Here, $f_{vin}$ is a frequency of the AC component of the drive voltage Vin, Ls is the inductance of the inductor 352, Cpz is an electrostatic capacity of the piezoelectric element 110, and Ls and Cpz are values for the frequency and a peak voltage the drive voltage Vin.

When the inductance Ls satisfies Expression (1) above, the piezoelectric element 110 and the inductor 352 configure a parallel resonance circuit, and the resonance frequency coincides with the frequency of the AC component of the drive voltage Vin. Therefore, the inductor 352 can decrease a current flowing into the piezoelectric element 110. Accordingly, it is possible to decrease power consumption of the piezoelectric element drive circuit. In particular, in a case of a thin film piezoelectric element 110 in which the thickness of the piezoelectric substance 140 is 0.05 µm to 20 µm, the electrostatic capacity is larger than that of a thick film (bulky) piezoelectric element. However, the inductor 352 can decrease power consumption of the piezoelectric element drive circuit.

The inductance Ls of the inductor 352 may not necessarily satisfy Expression (1) above, and may have a slightly offset value. That is, the inductor 352 may not be the resonance element in a strict sense. However, preferably, the inductance Ls of the inductor 352 has a value within a range of 100±10%, when the value obtained by Expression (1) above is set to 100%. Alternatively, preferably, the right side value in Expression (1) above falls within a range of the frequency $f_{vin}$±5% of the AC component of the drive voltage Vin.

Figure 7A:
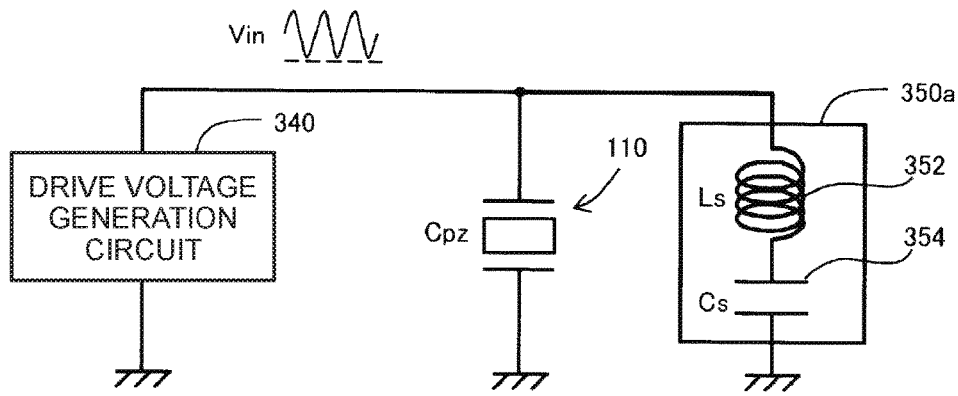
FIGS. 7A and 7B are views for describing a configuration of a piezoelectric element drive circuit according to a second embodiment.
Figure 7B:
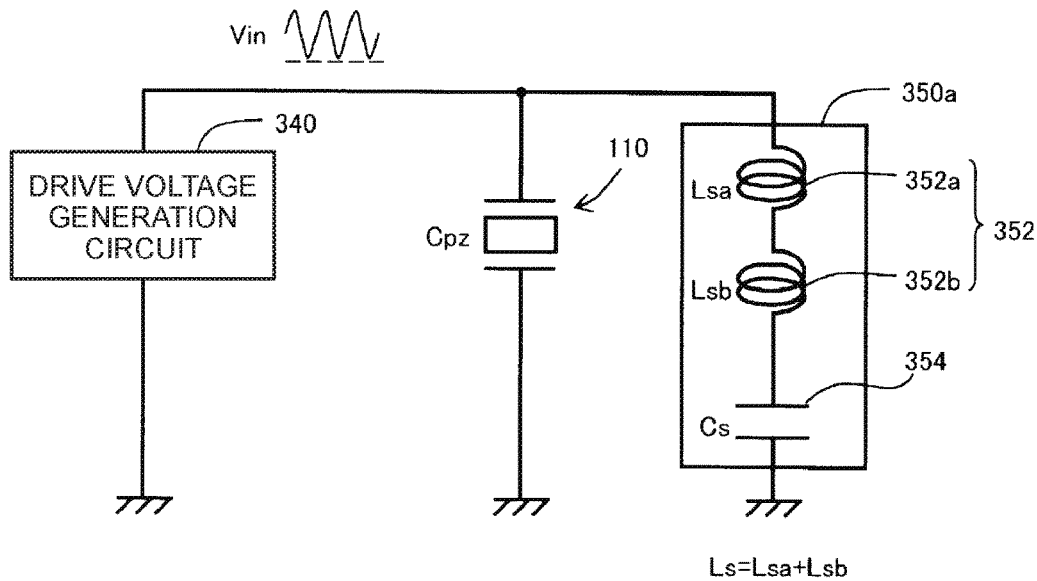

FIGS. 7A and 7B are views for describing a configuration of a piezoelectric element drive circuit according to a second embodiment. As illustrated in FIG. 7A, the piezoelectric element drive circuit according to the second embodiment is configured to include the drive voltage generation circuit 340, the piezoelectric element 110 connected to the drive voltage generation circuit 340, and a resonance element 350a connected to the piezoelectric element 110 in parallel. The resonance element 350a is configured so that the inductor 352 and a capacitor 354 are connected to each other in series. The inductor 352 has the inductance Ls, and the capacitor 354 has an electrostatic capacity Cs. The drive voltage generation circuit 340 supplies the drive voltage Vin including DC bias (DC component) and the AC component. The reason for disposing the capacitor 354 is that the capacitor 354 blocks the DC component flowing into the inductor 352, when the drive voltage Vin has the DC component.

FIG. 7B is an equivalent circuit of FIG. 7A. Here, the inductor 352 is divided into a first inductor 352a having first inductance Lsa and a second inductor 352b having second inductance Lsb. A sum of the inductance Lsa and Lsb is equal to the inductance Ls of the inductor 352. Preferably, the inductance Ls (=Lsa+Lsb) of the inductor 352 is set so as to satisfy the following expressions.

$$f_{vin}=1/\{2\pi\sqrt{(Lsa \cdot Cpz)}\} \quad (2a)$$

$$f_{vin}=1/\{2\pi\sqrt{(Lsb \cdot Cpz)}\} \quad (2b)$$

Here, $f_{vin}$ is the frequency of the AC component of the drive voltage Vin, Lsa and Lsb are the inductance of the inductors 352a and 352b, Cpz is the electrostatic capacity of the piezoelectric element 110, Cs is the electrostatic capacity of the capacitor 354, and Lsa, Lsb, Cpz, and Cs are values for the frequency and a peak voltage the drive voltage Vin.

When the inductance Ls satisfies Expressions (2a) and (2b) above, the piezoelectric element 110 and the first inductor 352a configure a parallel resonance circuit, and the second inductor 352b and the capacitor 354 configure a series resonance circuit. The resonance frequencies coincide with the frequency of the AC component of the drive voltage Vin. Therefore, the inductor 352 and the capacitor 354 can decrease a current flowing into the piezoelectric element 110, thereby enabling power consumption of the piezoelectric element drive circuit to decrease. In particular, in a case of a thin film piezoelectric element 110 in which the thickness of the piezoelectric substance 140 is 0.05 µm to 20 µm, the electrostatic capacity is larger than that of a thick film (bulky) piezoelectric element. However, the inductor 352 and the capacitor 354 can decrease power consumption of the piezoelectric element drive circuit. According to the second embodiment, when the drive voltage Vin has the DC component, the capacitor 354 can block the DC component flowing into the inductor 352.

The inductance Lsa may not necessarily satisfy Expression (2a) above, and may have a slightly offset value. The inductance Lsb and the electrostatic capacity Cs in Expression (2b) are similar to the inductance Lsa. That is, the inductor 352 and the capacitor 354 may not be the resonance element in a strict sense. However, preferably, the respective right side values in Expressions (2a) and (2b) above fall within a range of the frequency $f_{vin}$±5% of the AC component of the drive voltage Vin.

As an offset-provided drive voltage including the AC component and the DC component (DC offset), it is preferable to use a pulsating voltage whose voltage value is always positive or negative. If this pulsating voltage is used as the drive voltage, it is possible to further decrease a drive current of the piezoelectric drive device 10.

Figure 8A:
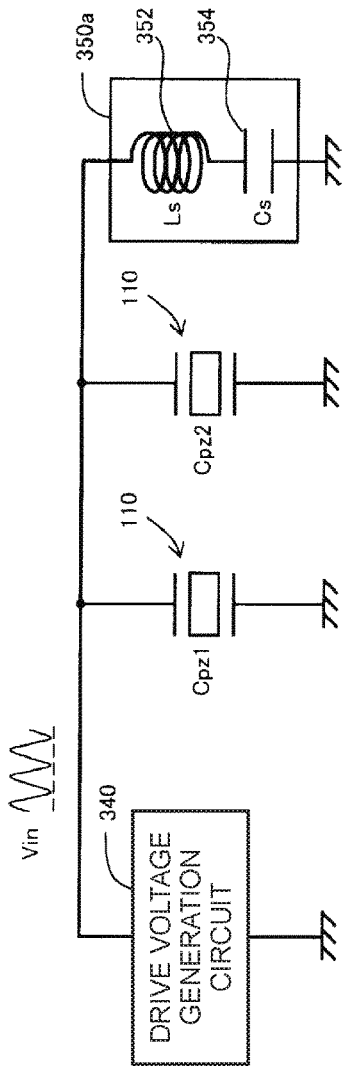
FIGS. 8A and 8B are views for describing a configuration of a piezoelectric element drive circuit according to a third embodiment.
Figure 8B:
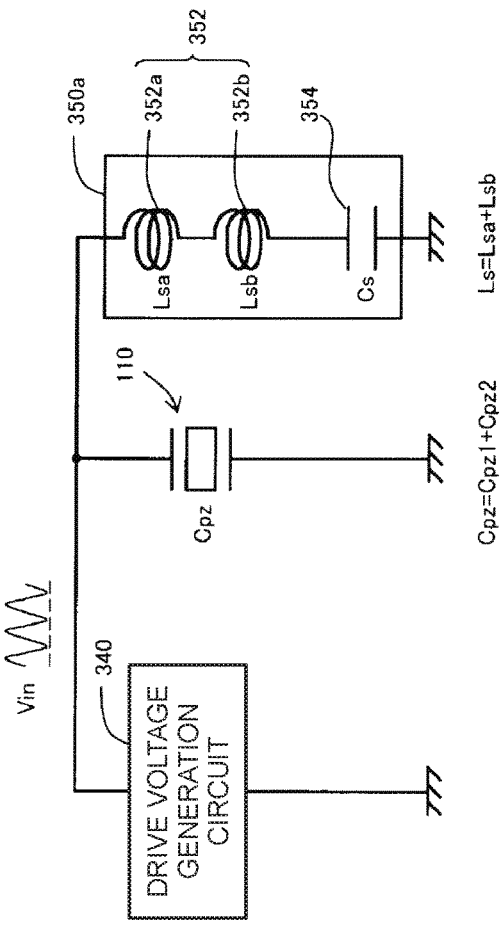

FIGS. 8A and 8B are views for describing a configuration of a piezoelectric element drive circuit according to a third embodiment. The piezoelectric element drive circuit according to the third embodiment illustrated in FIG. 8A is different from that according to the second embodiment in FIG. 7A in that the multiple piezoelectric elements 110 are connected to the drive voltage generation circuit 340 in parallel. The other configurations are the same as those according to the second embodiment. In this example, two piezoelectric elements 110 are connected to the drive voltage generation circuit 340. The respective piezoelectric elements 110 are assumed to have electrostatic capacities CPz1 and Cpz2. Here, the electrostatic capacities CPz1 and Cpz2 may be the same as each other, or may be different from each other.

FIG. 8B is an equivalent circuit of FIG. 8A. Here, the multiple piezoelectric elements 110 are represented by one synthetic electrostatic capacity Cpz. Similar to FIG. 7B, the inductor 352 is divided into the two inductors 352a and 352b. Preferably, the electrostatic capacity Cpz and the inductance Ls (=Lsa+lsb) are set so as to satisfy Expressions (2a) and (2b) above. Similarly to the second embodiment, according to the third embodiment, it is also possible to decrease power consumption of the piezoelectric element drive circuit. The number of the piezoelectric elements 110 is not limited two, and three or more piezoelectric elements 110 may be connected in parallel. For example, when 10 or more piezoelectric elements 110 connected to each other in parallel are simultaneously driven, the synthetic electrostatic capacity Cpz in FIG. 8B has a great value. Specifically, the synthetic electrostatic capacity Cpz can have a value which is equal to or greater than 100 nF. Even in this case, as illustrated in FIG. 8A, a current can be sufficiently decreased by disposing the inductor 352 and the capacitor 354. When the synthetic electrostatic capacity Cpz has the great value, the inductance Lsa in Expression (2a) above decreases. For this reason, it is preferable, since a size of the inductor 352 also decreases. When the drive voltage Vin does not include the DC component, the capacitor 354 may be omitted from the configuration illustrated in FIG. 8A.

Another Embodiment of Piezoelectric Drive Device

Figure 9:
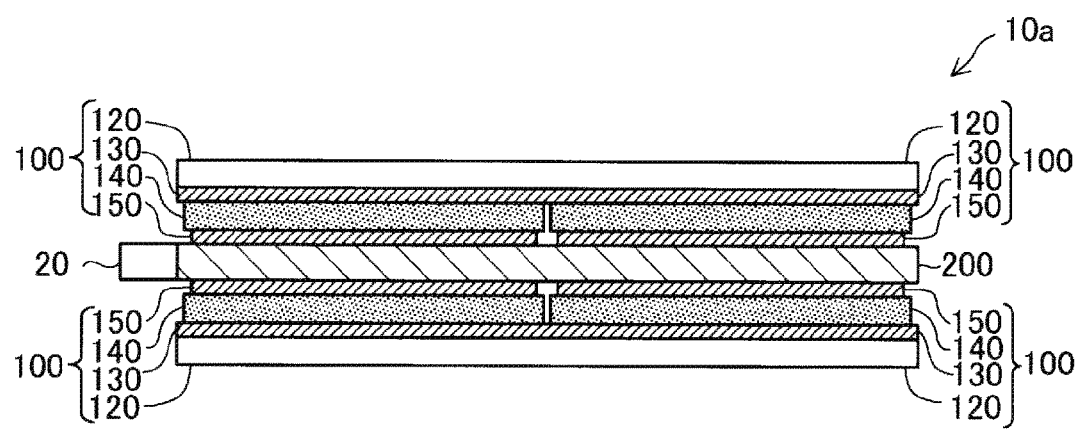
FIG. 9 is a sectional view of a piezoelectric drive device according to another embodiment.

FIG. 9 is a sectional view of a piezoelectric drive device 10a according to another embodiment of the invention, and is a view corresponding to FIG. 1B according to the first embodiment. In the piezoelectric drive device 10a, the piezoelectric vibrating body 100 is arranged in the vibration plate 200 in a state where the arrangement in FIG. 1B is upside down. That is, here, the second electrode 150 is arranged close to the vibration plate 200, and the substrate 120 is arranged farthest from the vibration plate 200. Similarly to FIG. 1B, FIG. 9 also omits the illustration of wiring (or a wiring layer and an insulating layer) for electrical connection between the second electrodes 150a to 150e, and wiring (or a wiring layer and an insulating layer) for electrical connection between the first electrode 130 and the second electrodes 150a to 150e. This piezoelectric drive device 10a can also achieve the same advantageous effect as that according to the first embodiment.

Figure 10A:
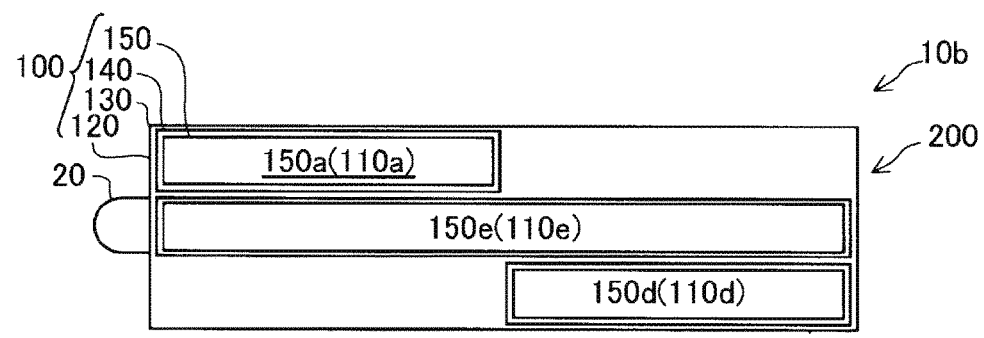
FIGS. 10A to 10C are plan views of the piezoelectric drive device according to another embodiment.
Figure 10B:
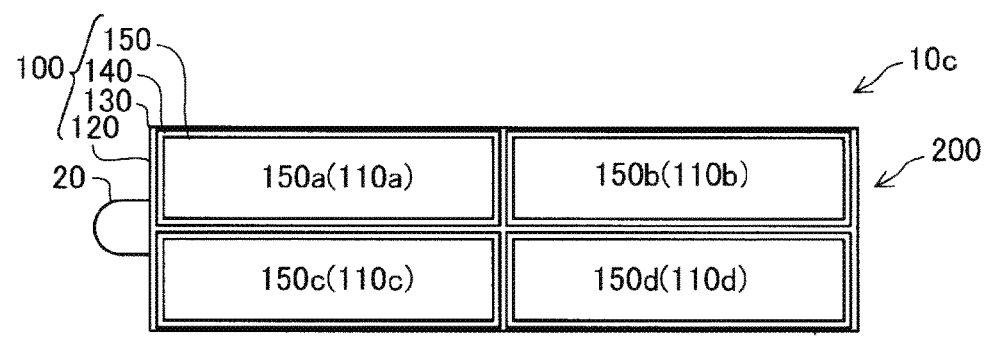
Figure 10C:
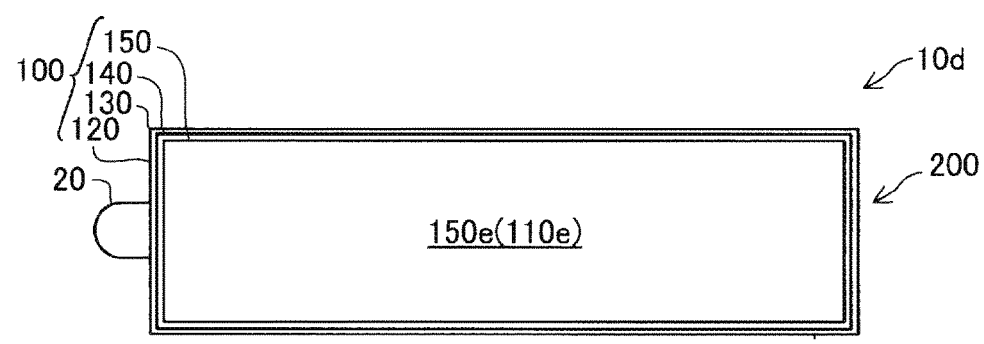

FIG. 10A is a plan view of a piezoelectric drive device 10b according to further another embodiment of the invention, and is a view corresponding to FIG. 1A according to the first embodiment. In FIGS. 10A to 10C, for convenience of illustration, the connection portion 220 and the attachment portion 230 of the vibration plate 200 are omitted in the illustration. In the piezoelectric drive device 10b in FIG. 10A, a pair of the second electrodes 150b and 150c is omitted. The piezoelectric drive device 10b can also rotate the rotor 50 in one direction z as illustrated in FIG. 5. The same voltage is applied to the three second electrodes 150a, 150e, and 150d in FIG. 10A. Accordingly, the three second electrodes 150a, 150e, and 150d may be formed as one continuous electrode layer.

FIG. 10B is a plan view of a piezoelectric drive device 10c according to further another embodiment of the invention. In the piezoelectric drive device 10c, the second electrode 150e located in the center of FIG. 1A is omitted in the illustration, and the other four second electrodes 150a, 150b, 150c, and 150d are formed so as to have an area which is larger than that in FIG. 1A. This piezoelectric drive device 10c can also achieve substantially the same advantageous effect as that according to the first embodiment.

FIG. 10C is a plan view of a piezoelectric drive device 10d according to further another embodiment of the invention. According to the piezoelectric drive device 10d, the four second electrodes 150a, 150b, 150c, and 150d in FIG. 1A are omitted, and one second electrode 150e is formed to have a large area. The piezoelectric drive device 10d only expands and contracts in the longitudinal direction, but can apply strong force to a driven body (not illustrated) from the protrusion portion 20.

As can be understood from FIGS. 1A, 1B, and 10A to 10C, at least one electrode layer can be disposed as the second electrode 150 of the piezoelectric vibrating body 100. However, as in the embodiments illustrated in FIGS. 1A, 1B, and 10A to 10C, if the second electrode 150 is disposed at an opposite angle position of the rectangular piezoelectric vibrating body 100, it is preferable since the piezoelectric vibrating body 100 and the vibration plate 200 can be deformed into a meandering shape which is bent inside a plane thereof.

Embodiment of Device Employing Piezoelectric Drive Device

The above-described piezoelectric drive device 10 applies great force to the driven body by utilizing resonance, and can be applied to various devices. For example, the piezoelectric drive device 10 can be used as a drive device for various apparatuses such as a robot (also including an electronic component conveying apparatus (IC handler)), a medication pump, a timepiece calendar feeding device, a printing apparatus (for example, a sheet feeding mechanism. However, not applicable to a head since the vibration plate is not caused to resonate in the piezoelectric drive device used for the head). Hereinafter, a representative embodiment will be described.

Figure 11:
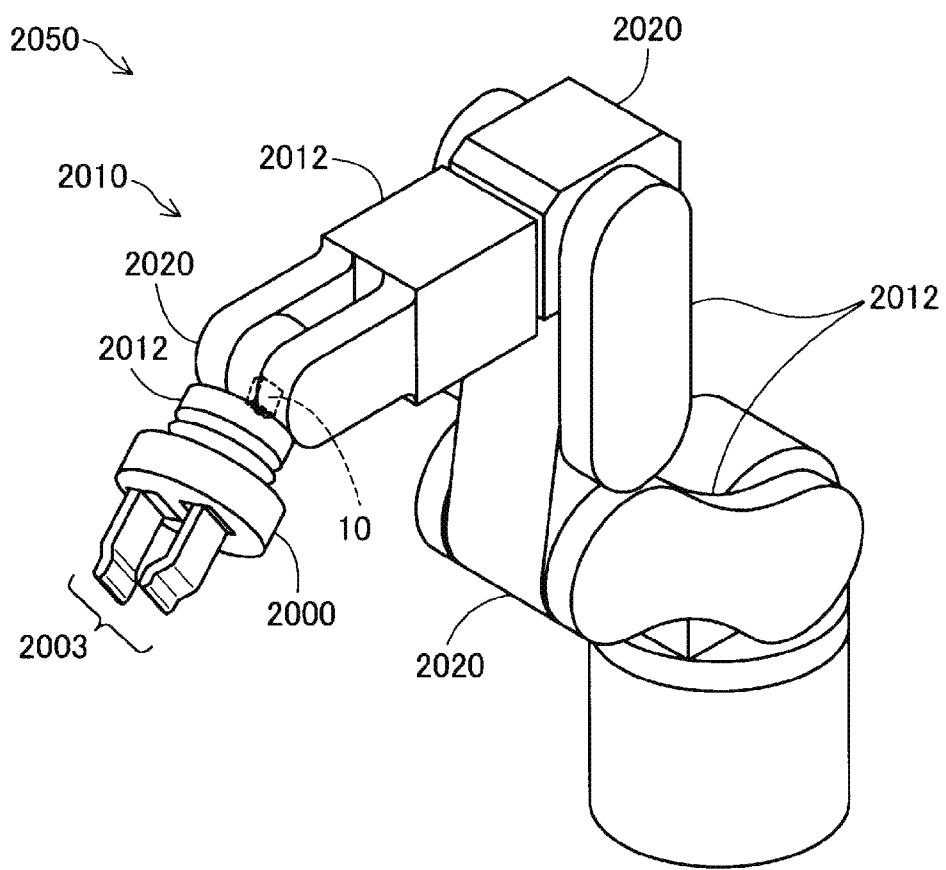
FIG. 11 is a view for describing an example of a robot which uses the piezoelectric drive device.

FIG. 11 is a view for describing an example of a robot 2050 which employs the above-described piezoelectric drive device 10. The robot 2050 has an arm 2010 (also referred to as an "arm unit") which includes multiple link portions 2012 (also referred to as a "link member") and multiple joint portions 2020 for connecting the link portions 2012 to each other in a pivotable or bendable state. The above-described piezoelectric drive device 10 is incorporated in the respective joint portions 2020, and the joint portions 2020 can be pivotally moved or bent at any desired angle by using the piezoelectric drive device 10. A robot hand 2000 is connected to a distal end of the arm 2010. The robot hand 2000 includes a pair of gripping portions 2003. The piezoelectric drive device 10 is also incorporated in the robot hand 2000. The robot hand 2000 can grip an object by using the piezoelectric drive device 10 so as to open and close the gripping portions 2003. The piezoelectric drive device 10 is also disposed between the robot hand 2000 and the arm 2010. The robot hand 2000 can be rotated with respect to the arm 2010 by using the piezoelectric drive device 10.

Figure 12:
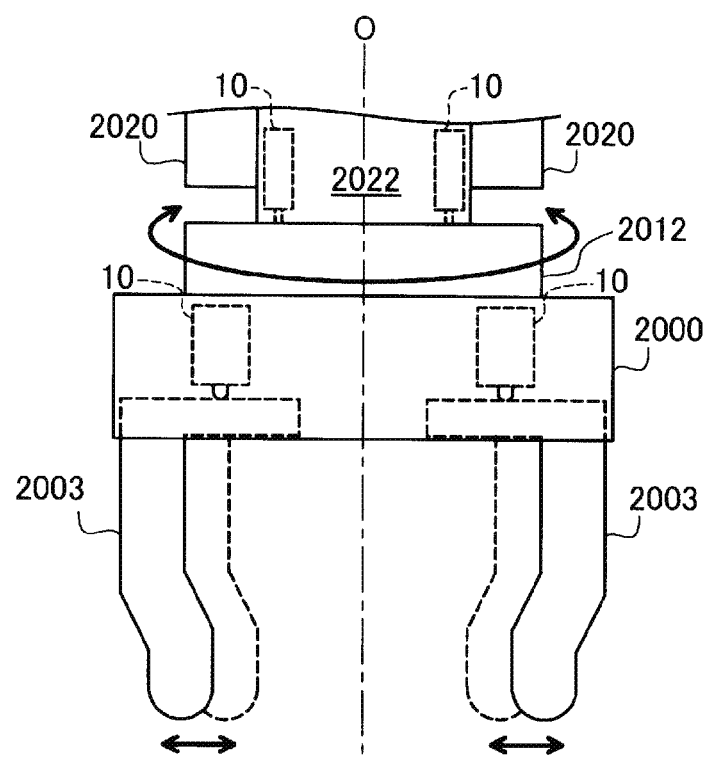
FIG. 12 is a view for describing a wrist portion of the robot.

FIG. 12 is a view for describing a wrist portion of the robot 2050 illustrated in FIG. 11. The joint portions 2020 on the wrist interpose a wrist pivotally moving portion 2022 therebetween, and the link portion 2012 on the wrist is attached to the wrist pivotally moving portion 2022 so as to be pivotally movable around a central axis O of the wrist pivotally moving portion 2022. The wrist pivotally moving portion 2022 includes the piezoelectric drive device 10. The piezoelectric drive device 10 pivotally moves the link portion 2012 on the wrist and the robot hand 2000 around the central axis O. The multiple gripping portions 2003 are erected in the robot hand 2000. A proximal end portion of the gripping portion 2003 is movable inside the robot hand 2000. The piezoelectric drive device 10 is mounted on a base portion of the gripping portion 2003. Therefore, the gripping portions 2003 are moved so as to grip a target by operating the piezoelectric drive device 10.

As the robot, without being limited to a single arm robot, the piezoelectric drive device 10 can also be applied to a multi-arm robot in which the number of arms is two or more. Here, in addition to the piezoelectric drive device 10, the joint portion 2020 on the wrist or the inside of the robot hand 2000 includes a power line for supplying power to various devices such as a force sensor and a gyro sensor or signal line for transmitting a signal. Accordingly, enormous wiring is needed. Therefore, it was very difficult to arrange the wiring inside the joint portion 2020 or the robot hand 2000. However, the piezoelectric drive device 10 according to the above-described embodiments can decrease a drive current compared to a normal electric motor or the piezoelectric drive device in the related art. Therefore, it is possible to arrange the wiring even in a small space such as the joint portion 2020 (particularly, a distal end joint portion of the arm 2010) and the robot hand 2000.

Figure 13:
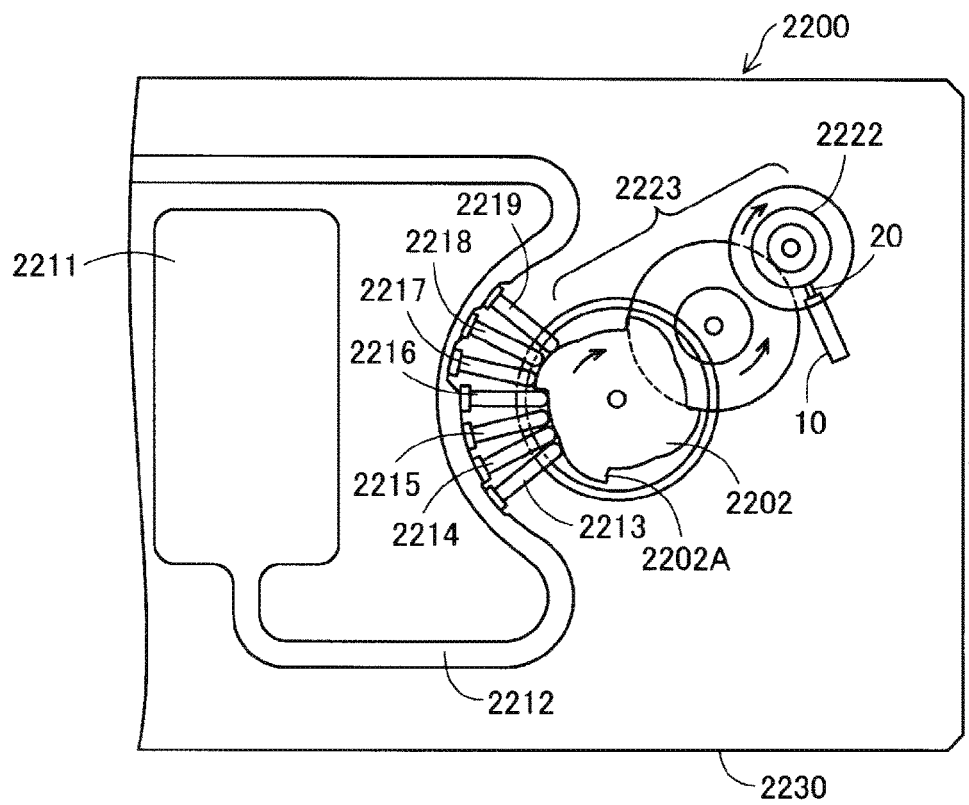
FIG. 13 is a view for describing an example of a liquid feeding pump which uses the piezoelectric drive device.

FIG. 13 is a view for describing an example of a liquid feeding pump 2200 employing the above-described piezoelectric drive device 10. In the liquid feeding pump 2200, a case 2230 internally has a reservoir 2211, a tube 2212, the piezoelectric drive device 10, a rotor 2222, a deceleration transmission mechanism 2223, a cam 2202, and multiple fingers 2213, 2214, 2215, 2216, 2217, 2218, and 2219. The reservoir 2211 is an accommodation section for accommodating a liquid which is a transport target. The tube 2212 is used in order to transport the liquid fed from the reservoir 2211. The contact member 20 of the piezoelectric drive device 10 is disposed in a state of being pressed against a side surface of the rotor 2222, and the piezoelectric drive device 10 rotatably drives the rotor 2222. A rotation force of the rotor 2222 is transmitted to the cam 2202 via the deceleration transmission mechanism 2223. The fingers 2213 to 2219 are members for blocking the tube 2212. If the cam 2202 is rotated, the fingers 2213 to 2219 are sequentially pressed radially outward by a protrusion portion 2202A of the cam 2202. The fingers 2213 to 2219 block the tube 2212 sequentially from the upstream side (reservoir 2211 side) in the transport direction. In this manner, the liquid inside the tube 2212 is sequentially transported to the downstream side. According to this configuration, an extremely small amount of the liquid can be accurately fed. Moreover, a miniaturized liquid feeding pump 2200 can be implemented. An arrangement of each member is not limited to the illustrated example. A configuration may be adopted in which a ball disposed in the rotor 2222 blocks the tube 2212 without providing the fingers. The above-described liquid feeding pump 2200 can be utilized for a drug dispensing apparatus which administers a drug solution such as insulin to a human body. Here, a drive current is decreased by using the piezoelectric drive device 10 according to the above-described embodiments, compared to the piezoelectric drive device in the related art. Accordingly, it is possible to minimize power consumption of the drug dispensing apparatus. Therefore, the piezoelectric drive device 10 is particularly effective when the drug dispensing apparatus is driven by a battery.

Modification Example:

Without being limited to the above-described examples or embodiments, the invention can be embodied in various aspects within the scope not departing from the gist of the invention. For example, the invention can also be modified as follows.

Modification Example 1:

According to the above-described embodiments, the first electrode 130, the piezoelectric substance 140, and the second electrode 150 are formed on the substrate 120. However, the substrate 120 may be omitted, and the first electrode 130, the piezoelectric substance 140, and the second electrode 150 may be formed on the vibration plate 200.

Modification Example 2:

According to the above-described embodiments, each one of the piezoelectric vibrating bodies 100 is disposed on both surfaces of the vibration plate 200. However, any one of the piezoelectric vibrating bodies 100 can be omitted. However, if each of the piezoelectric vibrating bodies 100 is disposed on both surfaces of the vibration plate 200, it is preferable since the vibration plate 200 is more easily deformed into a meandering shape which is bent inside a plane thereof.

Hitherto, the embodiments of the invention have been described with reference to some examples. However, the above-described embodiments are provided in order to facilitate the understanding of the invention, and are not intended to limit the invention. The invention can be modified or improved without departing from the gist and the scope of the appended claims, and the invention includes its equivalents as a matter of course.

The entire disclosure of Japanese Patent Application No. 2015-018206, filed Feb. 2, 2015 is expressly incorporated by reference herein.

What is claimed is:

1. A piezoelectric element drive circuit comprising:
   a piezoelectric element that has a piezoelectric substance whose thickness is 0.05 µm to 20 µm, and two electrodes which interpose the piezoelectric substance therebetween;
   an inductor that is connected to the piezoelectric element in parallel;
   a drive voltage generation circuit that applies a drive voltage including an AC component to the piezoelectric element and the inductor; and
   a capacitor that is connected to the inductor in series,
   wherein the drive voltage is a voltage obtained by adding a DC component to the AC component, and
   wherein inductance of the inductor is a sum of first inductance which configures parallel resonance with the piezoelectric element and second inductance which configures series resonance with the capacitor, and is set so that a resonance frequency of the parallel resonance and a resonance frequency of the series resonance are coincident with each other.

2. The piezoelectric element drive circuit according to claim 1, further comprising:
   a plurality of the piezoelectric elements;

wherein the inductor is connected to the plurality of the piezoelectric elements in parallel, and wherein the drive voltage generation circuit supplies the drive voltage in common to the plurality of the piezoelectric elements which are connected in parallel.

3. A robot comprising:

multiple link portions;

a joint portion that connects the multiple link portions to each other; and the piezoelectric element drive circuit according to claim 1, which pivotally moves the multiple link portions in the joint portion by using the piezoelectric element.

* * * * *